(12) United States Patent
Pogodin et al.

(10) Patent No.: US 8,402,359 B1
(45) Date of Patent: Mar. 19, 2013

(54) METHOD AND APPARATUS FOR MANAGING RECENT ACTIVITY NAVIGATION IN WEB APPLICATIONS

(75) Inventors: Andrey Pogodin, San Mateo, CA (US); Pierre Raynaud-Richard, Redwood City, CA (US); Irina Simpson, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 165 days.

(21) Appl. No.: 12/828,167

(22) Filed: Jun. 30, 2010

(51) Int. Cl.
*G06F 17/00* (2006.01)

(52) U.S. Cl. ......... 715/206; 715/234; 715/810; 715/854

(58) Field of Classification Search .......... 715/205–208, 715/234, 273, 738, 760, 777, 810, 854–855; 709/202, 203, 206, 223–224, 227–228; 707/E17.111, E17.119, 999.003, 999.102, 707/999.104
See application file for complete search history.

(56) References Cited

U.S. PATENT DOCUMENTS

| | | | |
|---|---|---|---|
| 5,355,497 A | 10/1994 | Cohen-Levy | |
| 5,608,865 A | 3/1997 | Midgely et al. | |
| 5,701,472 A | 12/1997 | Koerber et al. | |
| 5,875,431 A | 2/1999 | Heckman et al. | |
| 5,903,879 A | 5/1999 | Mitchell | |
| 5,963,964 A * | 10/1999 | Nielsen | 715/255 |
| 6,049,812 A * | 4/2000 | Bertram et al. | 715/205 |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,425,764 B1 | 7/2002 | Lamson | |
| 6,460,060 B1 * | 10/2002 | Maddalozzo et al. | 715/234 |
| 6,539,379 B1 | 3/2003 | Vora et al. | |
| 6,553,365 B1 | 4/2003 | Summerlin et al. | |
| 6,607,389 B2 | 8/2003 | Genevie | |
| 6,622,128 B1 | 9/2003 | Bedell et al. | |
| 6,738,760 B1 | 5/2004 | Krachman | |
| 6,805,351 B2 | 10/2004 | Nelson | |
| 6,832,205 B1 | 12/2004 | Aragones et al. | |
| 6,839,682 B1 | 1/2005 | Blume et al. | |
| 6,944,597 B2 | 9/2005 | Callen et al. | |

(Continued)

FOREIGN PATENT DOCUMENTS

EP 2110781 A1 10/2009

OTHER PUBLICATIONS www.pss-systems.com; retrieved from www. Archive.org any linkage dated Dec. 8, 2005, 130 pages.

(Continued)

*Primary Examiner* — Cesar Paula
*Assistant Examiner* — James H Blackwell
(74) *Attorney, Agent, or Firm* — Shumaker & Sieffert, P.A.

(57) ABSTRACT

A method and apparatus are provided for maintaining the navigation history of a web application that includes techniques for maintaining those pages that are considered valuable. The method and apparatus further include techniques for registering a visited page into the application navigation history, displaying a particular history menu of a web page, and, to pass stateful information, using a redirecting technique that includes redirecting a user to a history page to obtain the stateful information once the user has chosen a menu item.

19 Claims, 5 Drawing Sheets

U.S. PATENT DOCUMENTS

| | | | |
|---|---|---|---|
| 6,966,053 B2 | 11/2005 | Paris et al. | |
| 6,976,083 B1 | 12/2005 | Baskey et al. | |
| 6,981,210 B2 * | 12/2005 | Peters et al. | 715/234 |
| 7,076,439 B1 | 7/2006 | Jaggi | |
| 7,082,573 B2 * | 7/2006 | Apparao et al. | 715/745 |
| 7,103,602 B2 | 9/2006 | Black et al. | |
| 7,104,416 B2 | 9/2006 | Gasco et al. | |
| 7,107,416 B2 | 9/2006 | Stuart et al. | |
| 7,120,914 B1 * | 10/2006 | Manthos et al. | 718/108 |
| 7,127,470 B2 | 10/2006 | Takeya | |
| 7,146,388 B2 | 12/2006 | Stakutis et al. | |
| 7,162,427 B1 | 1/2007 | Myrick et al. | |
| 7,197,716 B2 | 3/2007 | Newell et al. | |
| 7,206,789 B2 | 4/2007 | Hurmiz et al. | |
| 7,225,249 B1 | 5/2007 | Barry et al. | |
| 7,233,959 B2 | 6/2007 | Kanellos et al. | |
| 7,236,953 B1 | 6/2007 | Cooper et al. | |
| 7,240,296 B1 * | 7/2007 | Matthews et al. | 715/840 |
| 7,249,315 B2 * | 7/2007 | Moetteli | 715/234 |
| 7,281,084 B1 | 10/2007 | Todd et al. | |
| 7,283,985 B2 | 10/2007 | Schauerte et al. | |
| 7,284,985 B2 | 10/2007 | Genevie | |
| 7,333,989 B1 | 2/2008 | Sameshima et al. | |
| 7,386,468 B2 | 6/2008 | Calderaro et al. | |
| 7,433,832 B1 | 10/2008 | Bezos et al. | |
| 7,451,155 B2 | 11/2008 | Slackman et al. | |
| 7,478,096 B2 | 1/2009 | Margolus et al. | |
| 7,496,534 B2 | 2/2009 | Olsen et al. | |
| 7,502,891 B2 | 3/2009 | Shachor | |
| 7,512,636 B2 | 3/2009 | Verma et al. | |
| 7,558,853 B2 | 7/2009 | Alcorn et al. | |
| 7,580,961 B2 | 8/2009 | Todd et al. | |
| 7,594,082 B1 | 9/2009 | Kilday et al. | |
| 7,596,541 B2 | 9/2009 | deVries et al. | |
| 7,614,004 B2 * | 11/2009 | Milic-Frayling et al. | 715/762 |
| 7,617,458 B1 * | 11/2009 | Wassom et al. | 715/760 |
| 7,636,886 B2 * | 12/2009 | Wyle et al. | 715/277 |
| 7,720,825 B2 | 5/2010 | Pelletier et al. | |
| 7,730,148 B1 | 6/2010 | Mace et al. | |
| 7,742,940 B1 | 6/2010 | Shan et al. | |
| 7,774,721 B2 * | 8/2010 | Milic-Frayling et al. | 715/855 |
| 7,778,976 B2 | 8/2010 | D'Souza et al. | |
| 7,861,166 B1 * | 12/2010 | Hendricks | 715/277 |
| 7,865,817 B2 * | 1/2011 | Ryan et al. | 715/232 |
| 7,895,229 B1 | 2/2011 | Paknad | |
| 7,962,843 B2 * | 6/2011 | Milic-Frayling et al. | 715/206 |
| 8,073,729 B2 | 12/2011 | Kisin et al. | |
| 2001/0053967 A1 | 12/2001 | Gordon et al. | |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |
| 2002/0035480 A1 | 3/2002 | Gordon et al. | |
| 2002/0083090 A1 | 6/2002 | Jeffrey et al. | |
| 2002/0091553 A1 | 7/2002 | Callen et al. | |
| 2002/0091836 A1 * | 7/2002 | Moetteli | 709/227 |
| 2002/0095416 A1 | 7/2002 | Schwols | |
| 2002/0103680 A1 | 8/2002 | Newman | |
| 2002/0108104 A1 | 8/2002 | Song et al. | |
| 2002/0119433 A1 | 8/2002 | Callender | |
| 2002/0120859 A1 | 8/2002 | Lipkin et al. | |
| 2002/0123902 A1 | 9/2002 | Lenore et al. | |
| 2002/0143595 A1 | 10/2002 | Frank et al. | |
| 2002/0143735 A1 | 10/2002 | Ayi et al. | |
| 2002/0147801 A1 | 10/2002 | Gullotta et al. | |
| 2002/0162053 A1 | 10/2002 | Os | |
| 2002/0178138 A1 | 11/2002 | Ender et al. | |
| 2002/0184068 A1 | 12/2002 | Krishnan et al. | |
| 2002/0184148 A1 | 12/2002 | Kahn et al. | |
| 2003/0004985 A1 | 1/2003 | Kagimasa et al. | |
| 2003/0014386 A1 | 1/2003 | Jurado | |
| 2003/0018520 A1 | 1/2003 | Rosen | |
| 2003/0018663 A1 * | 1/2003 | Cornette et al. | 707/500.1 |
| 2003/0031991 A1 | 2/2003 | Genevie | |
| 2003/0033295 A1 | 2/2003 | Adler et al. | |
| 2003/0036994 A1 | 2/2003 | Witzig et al. | |
| 2003/0046287 A1 | 3/2003 | Joe | |
| 2003/0051144 A1 | 3/2003 | Williams | |
| 2003/0069839 A1 | 4/2003 | Whittington et al. | |
| 2003/0074354 A1 | 4/2003 | Lee et al. | |
| 2003/0097342 A1 | 5/2003 | Whittington | |
| 2003/0110228 A1 | 6/2003 | Xu et al. | |
| 2003/0139827 A1 | 7/2003 | Phelps | |
| 2003/0229522 A1 | 12/2003 | Thompson et al. | |
| 2004/0002044 A1 | 1/2004 | Genevie | |
| 2004/0003351 A1 * | 1/2004 | Sommerer et al. | 715/517 |
| 2004/0019496 A1 | 1/2004 | Angle et al. | |
| 2004/0034659 A1 | 2/2004 | Steger | |
| 2004/0039933 A1 | 2/2004 | Martin et al. | |
| 2004/0060063 A1 | 3/2004 | Russ et al. | |
| 2004/0068432 A1 | 4/2004 | Meyerkopf et al. | |
| 2004/0078368 A1 | 4/2004 | Excoffier et al. | |
| 2004/0088283 A1 | 5/2004 | Lissar et al. | |
| 2004/0088332 A1 | 5/2004 | Lee et al. | |
| 2004/0088729 A1 | 5/2004 | Petrovic et al. | |
| 2004/0103284 A1 | 5/2004 | Barker | |
| 2004/0133573 A1 | 7/2004 | Miloushev et al. | |
| 2004/0138903 A1 | 7/2004 | Zuniga | |
| 2004/0143444 A1 | 7/2004 | Opsitnick et al. | |
| 2004/0187164 A1 | 9/2004 | Kandasamy et al. | |
| 2004/0193703 A1 | 9/2004 | Loewy et al. | |
| 2004/0204947 A1 | 10/2004 | Li et al. | |
| 2004/0215619 A1 | 10/2004 | Rabold | |
| 2004/0216039 A1 | 10/2004 | Lane et al. | |
| 2004/0260569 A1 | 12/2004 | Bell et al. | |
| 2005/0060175 A1 | 3/2005 | Farber et al. | |
| 2005/0071251 A1 | 3/2005 | Linden et al. | |
| 2005/0071284 A1 | 3/2005 | Courson et al. | |
| 2005/0074734 A1 | 4/2005 | Randhawa | |
| 2005/0114241 A1 | 5/2005 | Hirsch et al. | |
| 2005/0144114 A1 | 6/2005 | Ruggieri et al. | |
| 2005/0160361 A1 | 7/2005 | Young | |
| 2005/0165734 A1 | 7/2005 | Vicars et al. | |
| 2005/0187813 A1 | 8/2005 | Genevie | |
| 2005/0203821 A1 | 9/2005 | Petersen et al. | |
| 2005/0240578 A1 | 10/2005 | Biederman, Sr. et al. | |
| 2005/0246451 A1 * | 11/2005 | Silverman et al. | 709/231 |
| 2005/0283346 A1 | 12/2005 | Elkins, II et al. | |
| 2006/0036464 A1 | 2/2006 | Cahoy et al. | |
| 2006/0036649 A1 | 2/2006 | Simske et al. | |
| 2006/0074793 A1 | 4/2006 | Hibbert et al. | |
| 2006/0095421 A1 | 5/2006 | Nagai et al. | |
| 2006/0126657 A1 | 6/2006 | Beisiegel et al. | |
| 2006/0136435 A1 | 6/2006 | Nguyen et al. | |
| 2006/0143248 A1 | 6/2006 | Nakano et al. | |
| 2006/0143464 A1 | 6/2006 | Ananthanarayanan et al. | |
| 2006/0149407 A1 | 7/2006 | Markham et al. | |
| 2006/0149735 A1 | 7/2006 | DeBie et al. | |
| 2006/0156381 A1 | 7/2006 | Motoyama | |
| 2006/0156382 A1 | 7/2006 | Motoyama | |
| 2006/0167704 A1 | 7/2006 | Nicholls et al. | |
| 2006/0174320 A1 | 8/2006 | Maru et al. | |
| 2006/0178917 A1 | 8/2006 | Merriam et al. | |
| 2006/0184718 A1 | 8/2006 | Sinclair | |
| 2006/0195430 A1 | 8/2006 | Arumainayagam et al. | |
| 2006/0229999 A1 | 10/2006 | Dodell et al. | |
| 2006/0230044 A1 | 10/2006 | Utiger | |
| 2006/0235899 A1 | 10/2006 | Tucker | |
| 2006/0242001 A1 | 10/2006 | Heathfield | |
| 2007/0016546 A1 | 1/2007 | DeVorchik et al. | |
| 2007/0048720 A1 | 3/2007 | Billauer | |
| 2007/0061156 A1 | 3/2007 | Fry et al. | |
| 2007/0061157 A1 | 3/2007 | Fry et al. | |
| 2007/0078900 A1 | 4/2007 | Donahue | |
| 2007/0099162 A1 | 5/2007 | Sekhar | |
| 2007/0100857 A1 | 5/2007 | DeGrande et al. | |
| 2007/0112783 A1 | 5/2007 | McCreight et al. | |
| 2007/0118556 A1 * | 5/2007 | Arnold et al. | 707/104.1 |
| 2007/0156418 A1 | 7/2007 | Richter et al. | |
| 2007/0162417 A1 | 7/2007 | Cozianu et al. | |
| 2007/0179829 A1 | 8/2007 | Laperi et al. | |
| 2007/0203810 A1 | 8/2007 | Grichnik | |
| 2007/0208690 A1 | 9/2007 | Schneider et al. | |
| 2007/0219844 A1 | 9/2007 | Santorine et al. | |
| 2007/0220435 A1 | 9/2007 | Sriprakash et al. | |
| 2007/0271230 A1 * | 11/2007 | Hart et al. | 707/3 |
| 2007/0271308 A1 | 11/2007 | Bentley et al. | |
| 2007/0271517 A1 | 11/2007 | Finkelman et al. | |

| | | |
|---|---|---|
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1* | 3/2008 | Holcombe ........................ 705/1 |
| 2008/0126156 A1 | 5/2008 | Jain et al. |
| 2008/0147642 A1 | 6/2008 | Leffingwell et al. |
| 2008/0148193 A1* | 6/2008 | Moetteli ....................... 715/854 |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1* | 8/2008 | Li ................................. 715/745 |
| 2008/0229037 A1 | 9/2008 | Bunte et al. |
| 2008/0294674 A1 | 11/2008 | Reztlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1* | 3/2009 | Chacko et al. ................ 719/315 |
| 2009/0094228 A1 | 4/2009 | Bondurant et al. |
| 2009/0100021 A1* | 4/2009 | Morris et al. ..................... 707/3 |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0193210 A1 | 7/2009 | Hewett et al. |
| 2009/0241054 A1* | 9/2009 | Hendricks ..................... 715/776 |
| 2009/0249179 A1* | 10/2009 | Shieh et al. ................... 715/206 |
| 2009/0249446 A1 | 10/2009 | Jenkins et al. |
| 2009/0254572 A1 | 10/2009 | Redlich et al. |
| 2009/0287658 A1* | 11/2009 | Bennett .............................. 707/3 |
| 2010/0017756 A1* | 1/2010 | Wassom et al. ............... 715/854 |
| 2010/0050064 A1* | 2/2010 | Liu et al. ....................... 715/202 |
| 2010/0070315 A1 | 3/2010 | Lu et al. |
| 2010/0088583 A1* | 4/2010 | Schachter ..................... 715/206 |
| 2010/0250625 A1 | 9/2010 | Olenick et al. |
| 2010/0251109 A1* | 9/2010 | Jin et al. ....................... 715/273 |
| 2011/0191344 A1* | 8/2011 | Jin et al. ....................... 707/739 |

OTHER PUBLICATIONS

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 18, 2010 from archive.org, 1 page.

Zhu, et al.; "Query Expansion Using Web Access Log Files"; Lecture Notes in Computer Science, 2005, vol. 3588/2005, pp. 686-695, Springer-Verlag, Berlin, Hedelberg.

Human Capital Mangement; "mySAP ERP Human Capital Management: Maximizing Workforce Potential"; retrieved from archive.org Aug. 18, 2009 www.sap.com, 1 page.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls in", available at http://www.krollontrack.com/publications/ediscoverybackgroundpaper.pdf, accessed Mar. 13, 2012, National Court Reporters Association, Apr. 2006, 7 pgs.

"Microsoft Computer Dictionary", Microsoft Press, Fifth Edition, 2002, p. 499.

* cited by examiner

| | | 508 | | 510 | 512a | 512b | 514 |
|---|---|---|---|---|---|---|---|
| | ID | Title | UserID | Type | Value1 | Value2 | Timestamp |
| 502 | 1 | Edit Notice XYZ | 1 | NoticeEdit | 8932 | NULL | 01/01/2010 00:01:01PST |
| 504 | 2 | Matter Detail M1 | 1 | MatterDetail | 23 | NULL | 01/01/2010 00:02:01PST |
| 506 | 3 | Recipient J. Smith | 2 | RecipDetail | 8932 | 11001 | 01/01/2010 00:03:01PST | they may be important to the user. In this specific example only page A and page C are remembered in the stack, and page B is forgotten, even though it may be important for the user.

METHOD AND APPARATUS FOR MANAGING RECENT ACTIVITY NAVIGATION IN WEB APPLICATIONS

BACKGROUND OF THE INVENTION

1. Technical Field

The invention relates to web-based applications. More particularly, the invention relates to self-customizing and maintaining the navigation history of a web application.

2. Description of the Prior Art

A typical business web application contains many logical modules. For example an Electronic Discovery Management System (EDMS) application may contain a set of pages responsible for editing information about legal matter, sending hold notices, maintaining data sources, maintaining lists of employees, etc.

Very often, there is a need to temporarily leave one module of the application in order to perform certain activities in another module and then navigate back. For example an EDMS user might start editing recipients of a hold notice at a hold notice module, then go to list of employees at a different module, copy a few people into a clipboard, then return back to the hold notice module, and paste the list from the clipboard.

In this disclosure, a module is a set of related pages logically related to each other. For example a Hold Notice module may contain a list of holds, a hold edit page, a hold view page, a view and edit recipients pages, etc. Usually it is fast and easy for a user to navigate within the module and no extra navigation mechanisms are necessary. However, when it comes to navigation between modules, this is not the case. For example, if a user wants to navigate to a matter view page from outside the matter module the user needs to:

Click "Matters" top menu item and get the matter search page;
Type in matter search criteria and click "Search";
Find the matter within search results; and
Click on the matter list item.

Likewise, navigation to the data source view page may have similar steps. Therefore it would be desirable to somehow navigate directly from the current data source to the current matter without performing these steps again and again.

It has been found that, typically, when a user needs to navigate back, such as in the example above from the People module to the Hold Notices module, the following navigation mechanisms are offered by prior art applications:

1. Browser back button (with or without an associated Back button menu.) The user clicks the Back button and the browser displays pages from its history store until the user finds and selects the right page. This solution has the following drawbacks:

This mechanism works well when all the pages are stateless, i.e. when the state of the page is fully defined by input parameters, and there is no page expiration. This mechanism does not work well for stateful pages, i.e. where a page needs to read a value of some state variable such as cookie or session variable to understand what content to display. To achieve more robust functionality in such situations application developers introduce page expiration so that the user doesn't get unpredictable results when clicking the Back button;

Page names in the browser history typically don't provide enough context for the user to decide to which page she wants to navigate;

The browser history doesn't survive a browser restart operation.

The "stack" oriented design. Suppose that the user navigated from page A to page B, then clicked the "back" button to navigate back to page A, then navigated to page C. The browser history stack remembers only page A and page C. The browser history stack drops page B from its memory because page B is not on the current navigation path of the browser, even if page B is very important for a user.

Displaying useless navigation options. Because the browser cannot understand the importance (or lack thereof) of certain pages within an application, the browser has to store all the pages in history regardless of whether such pages are important or not.

Lack of de-duplication. When a user navigated multiple times from one page to another, e.g. from page A->page B->page A->page C->and so forth, the history contains as many entries as times the browser hit a particular page. This may result in lots of redundant entries in navigation history. Redundant entries may prevent other useful history entries from showing up because history menus have finite size.

FIG. 1 shows a typical back button menu with drawbacks such as: cryptic titles, multiple entries for the same page, and missing entries when the page is not on a current navigation path (not shown, but implied), according to the prior art.

FIG. 2 shows an example navigation path, according to the prior art. The numbers, 1-10, show the sequence of navigation steps by a user. The dashed pages (Useful page2.jsp, Useful page4.jsp, and Useful page5.jsp) show the pages which are purged from the navigation history because they are not on a main navigation path, i.e. steps (1), (4), (9), and (10). The rest of the pages are displayed by the history menu.

2. Provide a "Back" link on an application page which points to the page from where the user came. For example, on an employee search result page, provide a link back to the Hold Notice recipient edit page. Major disadvantages of this approach include:

Adding many more integration points between parts of applications, the addition of which results in a lot of extra code and greater testing costs;

Developers must know in advance to where any user can possibly return from a given page; and There is only one page to where the user can return.

3. Provide navigation "breadcrumb" within application a menu allowing the user to easily navigate back to previous steps. One major disadvantage of this approach is the focus on the "stack", i.e. the same drawback as mentioned in item 1 above.

4. No easy history navigation at all. For example, in EDMS if the user needs to return back to a Hold Notice Recipients page from, e.g., a data source detail page, she may have to go to the List of Matters page, find a matter, click on the matter record, choose "Hold notices" from the submenu, find a hold notice and click a "Recipients" link. Needless to say, this option is very time consuming and most likely annoying for a user.

None of the above solutions are particularly good. There is a need for a navigation solution which is free from above mentioned drawbacks, yet doesn't have too many drawbacks of its own.

SUMMARY OF THE INVENTION

A method and apparatus are provided for maintaining the navigation history of a web application that includes techniques for maintaining those pages that are considered valuable. The method and apparatus further include techniques for registering a visited page into the application navigation history, displaying a particular history menu of a web page, and, to pass stateful information, using a redirecting technique that includes redirecting a user to a history page to obtain the stateful information once the user has chosen a menu item.

DETAILED DESCRIPTION OF THE INVENTION

A method and apparatus are provided for maintaining the navigation history of a web application that includes techniques for maintaining those pages that are considered valuable. The method and apparatus further include techniques for registering a visited page into the application navigation history, displaying a particular history menu of a web page, and, to pass stateful information, using a redirecting technique that includes redirecting a user to a history page to obtain the stateful information once the user has chosen a menu item.

Functional Overview

An embodiment provides a solution which includes maintaining an application's own navigation history and letting a user choose an item from a history picker when she wants to navigate back. A picker is a navigation menu displaying the links pointing to the pages which are stored in application-owned browsing history. Hereinafter, an embodiment of such method and apparatus is referred to as Application Based Recent History (ABRH).

Compared to the browser navigation history of the prior art, ABRH is not built as a stack. Instead, the history contains a list of the last N important navigation events. According to an embodiment, a particular navigation event is not required to reside on the current navigation path of the user in order to be included into the instant history.

Figure 1:
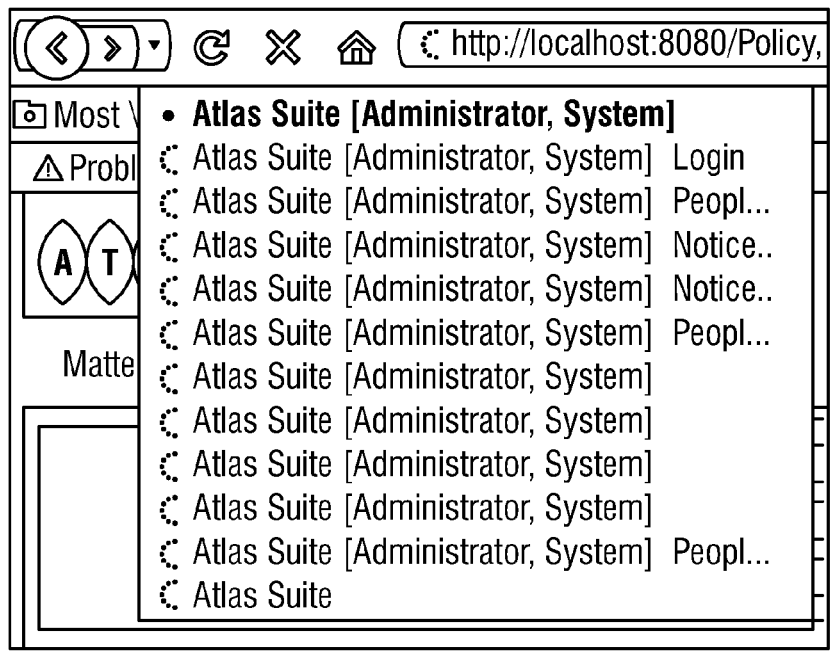
FIG. 1 shows a typical back button menu, according to the prior art.
Figure 2:
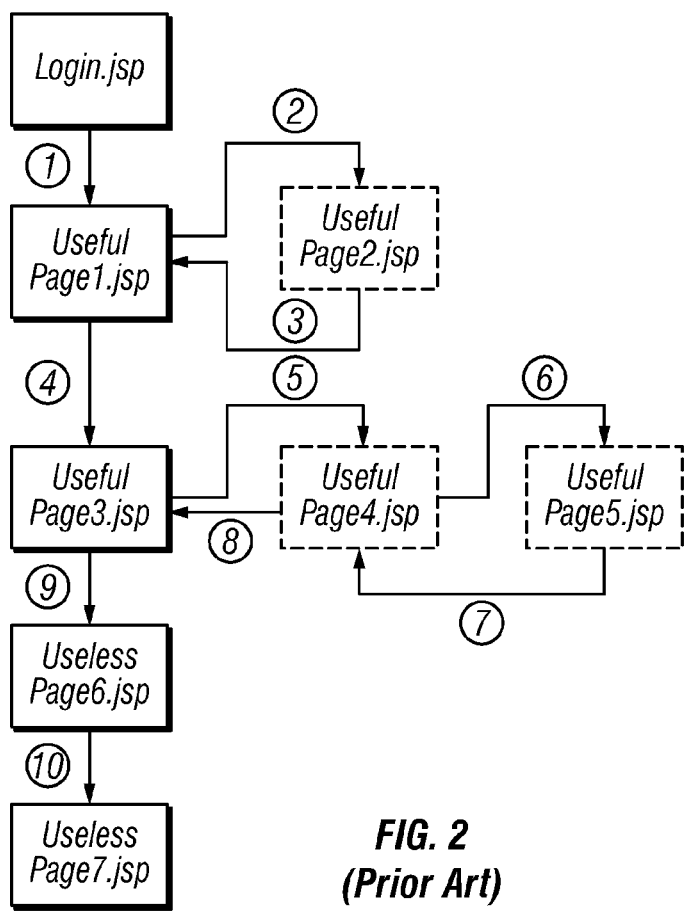
FIG. 2 shows an example navigation path, according to the prior art.
Figure 3:
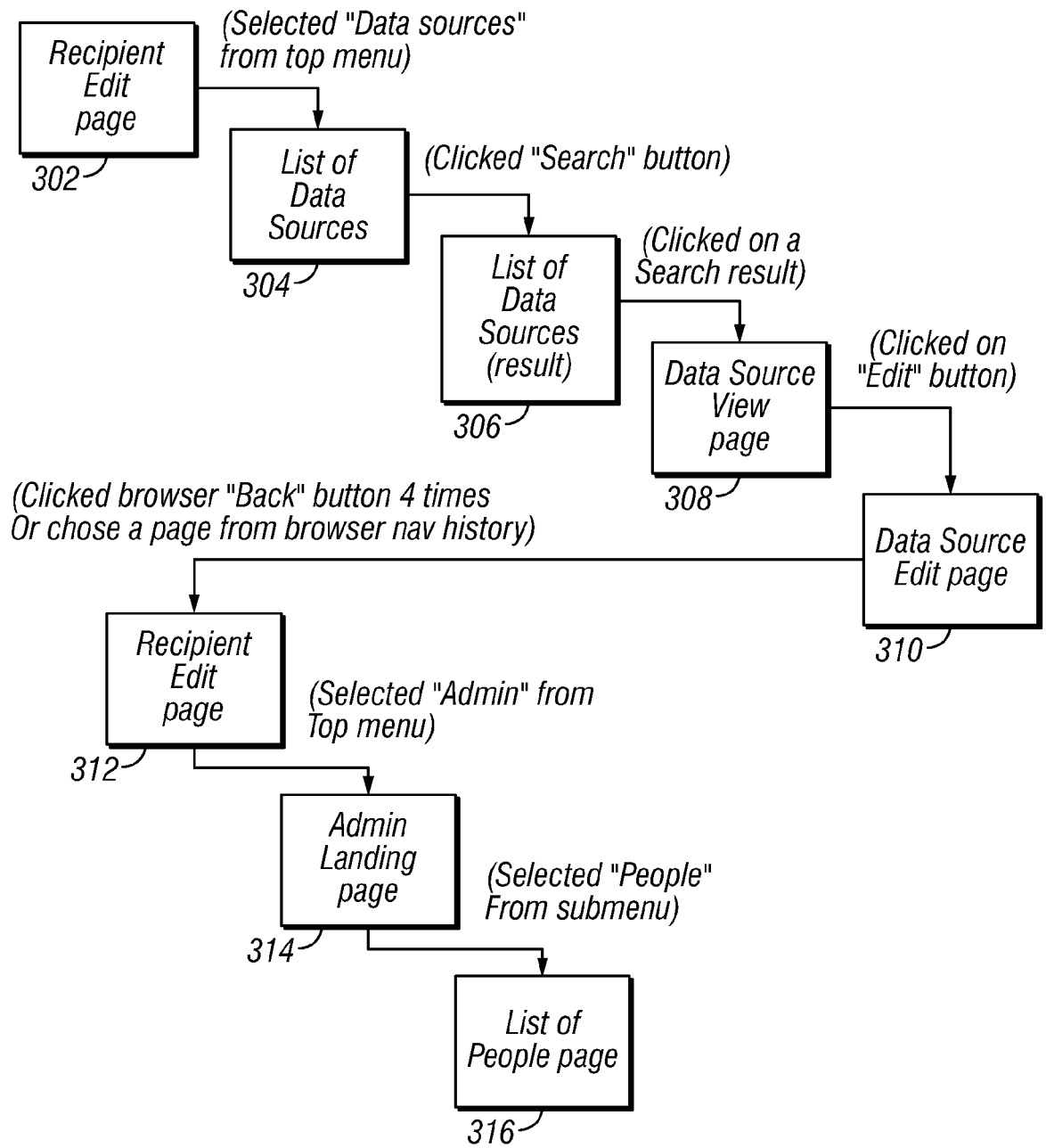
FIG. 3 is a schematic diagram showing a user navigating to a desired page using browser history, according to the prior art.

An example showing a user navigating to a desired page using browser history according to the prior art can be described with reference to FIG. 3. A user starts the navigation process at a Recipient Edit Page 302. From there, the user navigates to a List of Data sources page 304, a List of Data Sources results page 306, a Data Source View page 308, and, finally, to a Data Source Edit page 310. Then, the user navigates back to Recipient Edit Page 312 using the browser history by specifically clicking the browser Back button four (4) times. The, the user navigates to the Admin Landing page 314 and to the List of People page. As is shown in FIG. 3, Data Source Edit page 310 is purged from the browser history stack, once the user is at List of People page 316.

Data Source Edit page 310 being purged from the history is not the case with ABRH which selectively remembers important pages in the history regardless of their location in the navigation path. Thus, suppose a user, according to an embodiment of ABRH, navigated from a Recipient Edit page to a Data Source edit page of EDMS described above. Then, suppose, she navigated back to Recipient Edit page and then she navigated to the List of People page. Suppose further that Data Source Edit page happened to be important for user business and, therefore, the decision was made that each time a user visits Data Source Edit page, the page is added to ABRH. According to an embodiment, the user at the List of People page can navigate back to Data Source Edit page, because it was added to the history.

Thus, it should be appreciated that according to prior art methodologies, such access to the Data Source Edit page at this stage of the navigation would be not possible when the built-in browser Back button was used.

It should be appreciated that the conceptual difference between the prior art browser and ABRH is very significant: browsers have no way to understand which pages are important and which are not. Therefore, browsers act according to the "best guess" scenario which is that, most likely, the user will want to return back to pages which are on the main navigation path. According to an embodiment, the application knows which pages are important, thus the application can use a better predicting algorithm.

It should be appreciated that from the user experience, using ABRH resolves disadvantages, e.g. of the first and second approaches described above, at a reasonable price. For example see FIG. 4, a schematic diagram showing an example of a user performing particular navigation actions, according to an embodiment:

Originally a user was editing recipients on Recipients Edit page 402;

Then she navigated to the List of Data Sources 404 by selecting it from the top menu;

Then she narrowed down her prospective search results by typing in the search criteria and clicking "Search" button on the List of Data Sources page 404;

Then she selected a data source from the List of Data Sources results 406 and got redirected to a Data Source View page 408;

Then she clicked the "Edit" button and got redirected to a Data Source Edit page 410;

Then she selected "Admin" from the top menu and got redirected to Admin landing page 412; and Then she selected "People" from an Admin submenu and got redirected to the List of People page 414.

According to prior art the following will be displayed in the navigation history as a result of the user's particular navigation actions above:

Recipient Edit page;
List of Data Sources page;
List of Data Sources (again) page;
Data Source View page;
Data Source Edit page;
Admin Landing page; and
List of People page.

It should be appreciated that out of these pages only a few (e.g., Recipient Edit, Data Source View and Data Source Edit)

may be considered valuable enough to be maintained in the history. According to an embodiment, the history looks like the following:
Recipients Edit page;
Data Source View page; and
Data Source Edit page.

One or more embodiments of ABRH provide the following:

ABRH can work with "stateful" pages. For example suppose that the Notice Recipient page requires "legal matter id" variable to be populated in a user session or cookie. According to an embodiment of ABRH, instead of navigating directly to the web page and running a risk of not having a session variable populated, the browser first hits a particular redirect page, which populates the session variable if it is missing and forwards a request to Notice Recipients page. In other words when a user chooses an item from a picker, the application is not required to redirect strictly back to the original page.

For example. suppose there is a page called matterTargets.jsp. The page reads a variable "matter_id" from the user session, reads from the database a list of custodians associated with the matter using the value of "matter_id" as a query parameter and displays the information to the user so that the user can add or remove custodians from the matter.

Now imagine the user using this page to edit custodians for matter X. Then he decides to navigate to the matter detail of the matter Y and then navigate back to matter X using the browser "Back" button. At the time he navigated to Y matter, the "matter_id" session variable got updated with Y's matter's id. After the user clicks the Back button the page matterTargets.jsp showing the custodians for matter X is displayed from browser cache. The user adds another custodian to the matter and saves changes. He is confident that the current matter is X because the cached page tells him so. But on the server "matter_id" session variable is populated with Y's matter id. As a result a custodian is added to the matter Y instead of X.

To avoid this unintended consequence, according to prior art, programmers make the page expire so it is impossible to use the browser Back button.

In contrast, an embodiment solves the problem the following way: At the time the user entered matterTargets.jsp, this fact that the user entered matterTargets.jsp together with current matter id is stored in ABRH. Thus, when the user wants to navigate back to matterTargets.jsp for matter X, the system prepopulates the "matter_id" session variable with the value that was initially stored in the corresponding ABRH record. Only after that the browser requests the matterTargets.jsp page. Thus the data on server side is guaranteed to be in sync with the data on browser side. This became possible because the application understands the difference between various pages and can perform custom logic before redirecting the user to a particular page.

When an application populates the picker it is possible to create any page title for the navigation item which makes most business sense. For example in the case of the Notice Recipients page, the title may be "Edit recipients for Notice XYZ". Allowing any title for a navigation item is very user friendly. In the particular example, allowing any title for a navigation item is very user friendly, especially taking into account that the user may edit several notices (or generally speaking "process multiple objects of the same class") at a time and may want to distinguish between each of the notices by title.

User navigation history can be stored in the database. Thus, the navigation history can survive a browser restart, an application restart, a user logout, and the like.

An example data table used to store an ABRH record according to an embodiment can be described with reference to FIG. 5. In this example:

There are 3 records shown stored in the table (502, 504, 506);

The title stored in the Title column 508 is displayed in the ABHR navigation menu;

The Type field 510 is used for the system to distinguish between multiple types of navigation targets. Based on this value, the system generates different navigation URLs. Different types store different types of data in the Value1 512a and Value2 512b fields. The logic which compiles navigation URLs knows which data is stored in which fields for which type.

Value1 512a and Value2 512b fields are used for storing the parameters that are passed to the navigation URL. In this example, Value1 for NoticeEdit type stores the ID of the hold notice, Value1 for MatterDetail type stores matter id, Value 1 for RecipDetail type also stores matter id and Value2 stores custodian id.

Timestamp is used to indicate the sequence in which the menu items are displayed and to make decisions regarding which entries should be purged first.

Figures 4, 5:
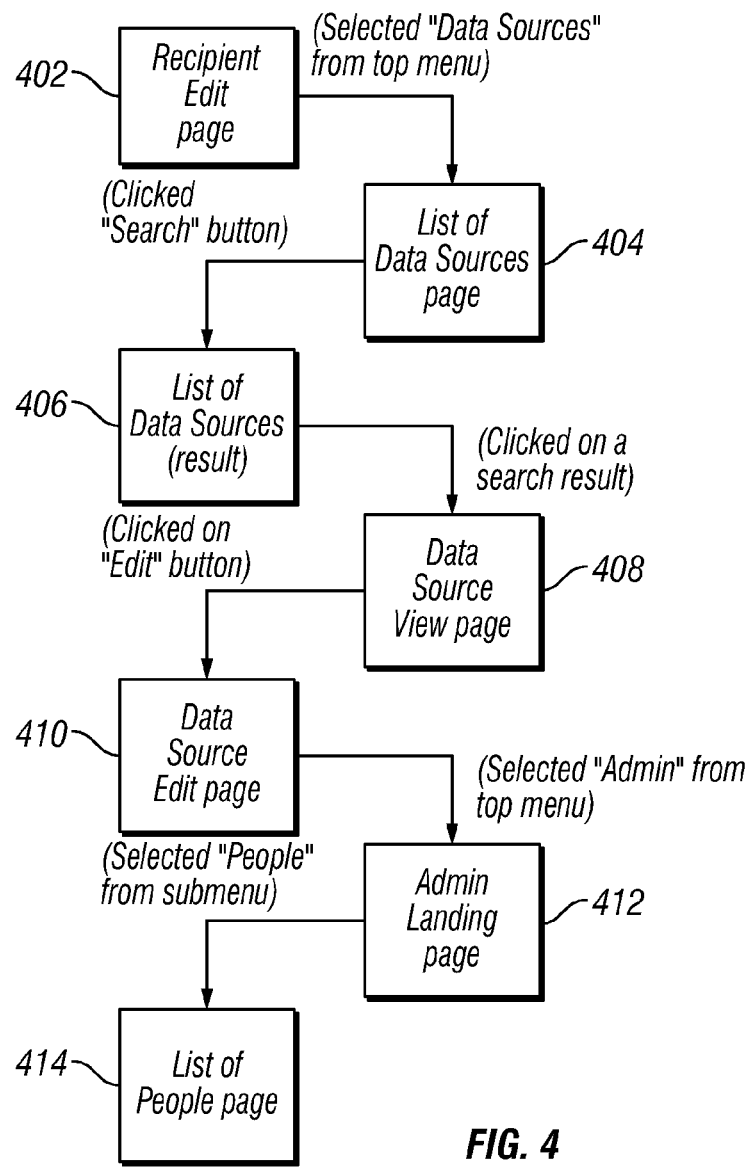
FIG. 4 is a schematic diagram showing an example of a user performing particular navigation actions, according to an embodiment.
FIG. 5 is an example data table used to store an ABRH record, according to an embodiment.

It should be appreciated that such schema depicted in FIG. 5 and described above is only one of many possible schemas and, thus, is by way of example only. The following option is also illustrative of an embodiment:

Navigation URLs are pre-calculated before a record is added to the table. Pre-calculating navigation URLs may eliminate the need to store structured data, but may create upgrade challenges when there is a need to change the URL or may limit functionality by not allowing more than one hyperlink to be associated with a single menu item.

It should further be appreciated that the user navigation history doesn't need to be flooded with unimportant pages to which a user may never return. See the example above as described by FIG. 4 and the accompanying text.

In an embodiment, the application's ABHR logic handles de-duplication. For example, if user visited the same edit page and edited the same object on this page, the application maintains a single navigation entry for that page. Further, the application updates a "last visited" timestamp each time a user enters the page so that the page with the latest edits shows up on top of the menu.

There is only one instance of the recent navigation menu. In an embodiment, the one instance of recent navigation menu is located at the header of the web page. Thus, each time a user enters a page worth recording into the history, the application records the fact that user entered this page by creating an ABRH record. Destination pages are not required to be aware of the logic of navigation history. Therefore, it should be appreciated that such approach described herein requires much fewer dependencies between modules, which simplifies programming and testing efforts and resourced.

Developers of destination pages do not need to know in advance from where a user may come. For example, in EDMS, a user can arrive at the "List of people" page from a plurality of places, e.g. whenever the user needs to find a person or validate person data. In this example, the developer of the Person list page does not need to predict all these behaviors.

In an embodiment, ABRH picker for each ABRH record may display a plurality of hyperlinks as opposed to an in-application Back button always pointing to a single page. For example:

User entered a notice editing page;

From the design viewpoint, user who enters this page also often wants to navigate to the notice recipient list page; and To facilitate that, ABRN menu generation logic can be implemented in such a way that each time a notice edit menu item is displayed in the ABRH menu, a separate link to the notice recipient page is also shown to the right of the main link.

Figure 6:
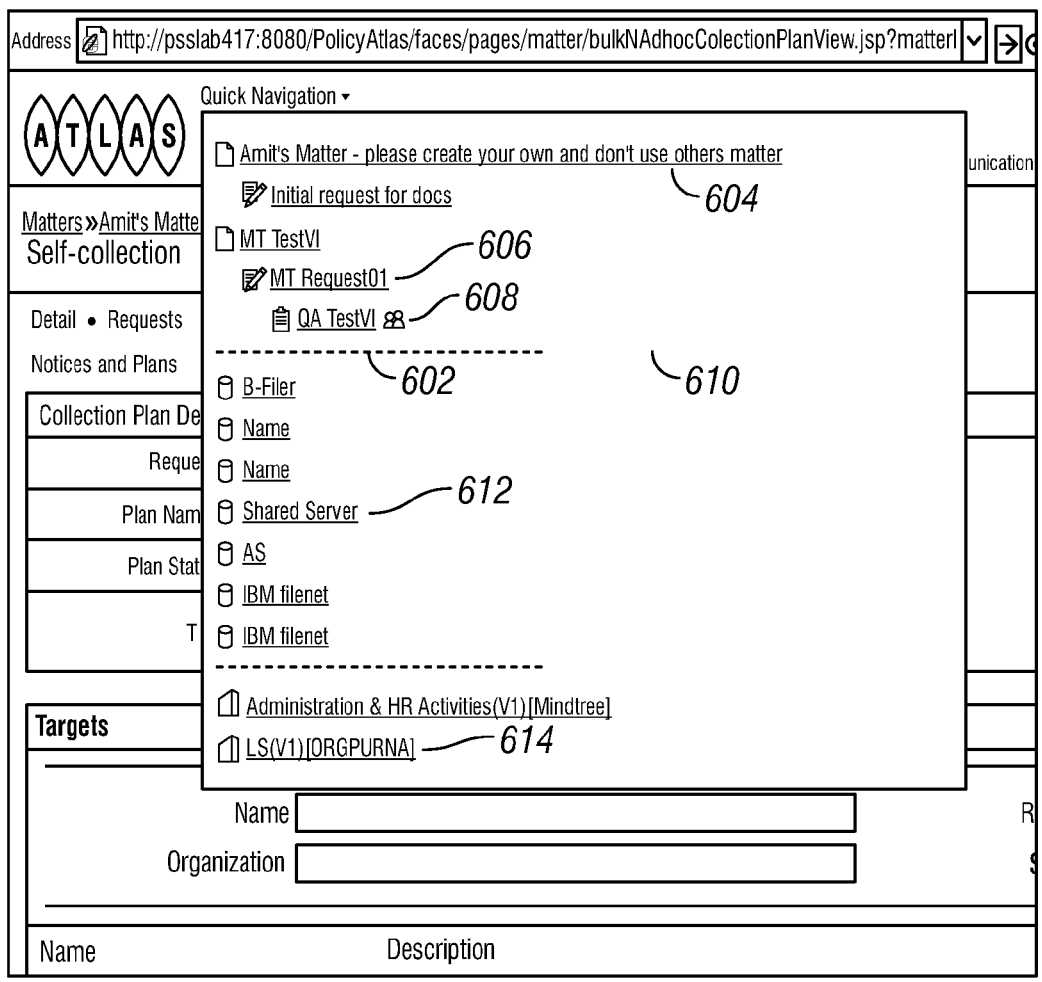
FIG. 6 is an example screen shot of a recent activity navigation menu, according to an embodiment.

An example is shown on FIG. 6, a screen shot of a recent activity navigation menu, according to an embodiment. On FIG. 6, a "QA Test VI" menu item 602 ($5^{th}$ from top), in addition to main URL contains a "Human figures" icon 608 which, when clicked, conveniently redirects the user to a "List of Recipients" page.

In addition to solving the issues which are inherent to other prior art navigation models, ABRH, according to an embodiment, provides the following possibilities:

When a user selects the ABRH menu item it may make business sense to navigate the user not exactly to the page he came from but to another related page. Such mechanics gives the designer of an information system additional flexibility. For example, instead of returning to the Notice Recipients Edit page, the user may be navigated to the Notice Recipient View page because the notice may change the state and become un-editable. In such case it may not make sense to implement extra conditional logic, such as "if the notice is uneditable than redirect to the view page" from a cost or development standpoint.

The ABRH menu may display other pages which the user hasn't yet visited, but which may make business sense for the user. For example, in addition to the Interview View page, the application may add navigation entries for interview recipient page. As another example, ABRH may add navigation entries for Notice Detail view pages, because Request and Legal Matter constitute the context of Hold Notice.

A Recent Activity Navigation menu according to an embodiment can be described with reference to FIG. 6. In FIG. 6, the Recent Activity Navigation menu is implemented as a DHTML drop down. FIG. 6 illustrates points described above, namely:

"QA Test VI" menu item 602 is displayed together with Matter items 604 and Request items 306 that this item belongs to, although Request items 606 has never been visited directly.

It should be appreciated that further in FIG. 6, names are self-explanatory and additional icons describe the type of page. As well, different ABRH entries are even grouped into three groups for ease of comprehension, in this example.

On FIG. 6, the first group 610 displays the entries related to matter management. Two top level menu items with "Blank page" icons represent matters and will lead to matter detail page if clicked. Next level entries with "Paper and pencil" icons represent discovery requests and lead to discovery request view pages if clicked.

QA Test VI item represents a virtual interview view page.

In the second group 612 all the menu items lead to view pages of various data source records. Therefore they display "barrel" icons representing data sources.

The third group 614 represents organizations and contains records for pointing to organization editing pages.

All menu items display the titles of objects. Only the pages that meaningful for the user are stored in the history.

Example Embodiment Overview

An embodiment of ABRH contains the following conceptual components, which are described in further detail below.

Maintaining application navigation history;

Registering a visited page in the application navigation history;

Displaying a history menu on a web page; and

Redirecting a user to a history page once the user chose a menu item.

Maintaining Application Navigation History (ANH)

An embodiment includes a persistent store containing ANH entries. The store provides enough information for the application to redirect to a proper page in the proper context. For example, if a user needs to navigate to a matter view page, the history preserves the information about: the fact that this is a matter view page to which the user can navigate and the id of the matter displayed on this page. See FIG. 5 for the example of a ABRH history record.

It should be appreciated that that there may be a plurality of ways how to preserve such information. For example and as shown above, in an embodiment, an ABRH record may be designed to store the page URL. That is, in order to call a page, browser needs to know a URL. A URL typically consists of the page name and query parameters which tell the application which object to look at. For example, the page for editing matter information may have a name matterEdit.jsp and require query parameters "?matter_id=23" to tell the page that matter 23 needs to be displayed. This URL can be compiled during ABRH record creation be stored in its entirety in the database or it can be assembled later, such as when the ABRH menu is rendered based on more structured data stored in ABRH table. See FIG. 5 for the latter scenario. Alternatively the ABRH record can be designed to store a navigation event type, which later can be resolved into the page URL or a plurality of URLs. Likewise context parameters, such as those shown in FIG. 5, can be stored in a well structured table where each parameter has its own designated field. Or, such context parameters may be stored in a number of value fields used to store parameters for a plurality of navigation record types, again, as shown in FIG. 5.

The ABRH records may reside either in user session, e.g. storage area assigned to the user after he logs in and deleted when he logs out or his session expires) or the application database. In the former scenario, the data will not survive a user logout. But the user may still enjoy all other benefits of the solution. In the latter scenario the design of data table requires the data table to distinguish navigation entries belonging to different users, such that each user sees only the user's entries. To achieve that, a record entry should contain a user identifier as shown in FIG. 5.

In an embodiment, the persistent store is capable of maintaining a fixed number of navigation entries thus showing only the most recent entries. Alternatively, in an embodiment, filtering out the most recent entries may be delegated to application code responsible for displaying the navigation menu.

As an example of the first approach, if the records are stored in a relational database, each time a new record is entered, the following SQL statement is executed to maintain the number of records per user<=20.

delete from abrh_record where id not in
(
    select id from

```
(
  select id from abrh_record where userId=2 order by
    timestamp desc
) where rownum<20
) and userId=2
```

An explanation of the above is as follows:

the inner-most statement returns all the menu entries for a given user ordered by record timestamp in descending order;

the second-level statement cuts off the first 20 rows. These rows are the most recent entries whish should survive the cleanup process; and the outer-most statement deletes the rows from the table if they belong to a given user and they are not among first 20 rows.

It should be appreciated that if such a cleanup is performed, the application doesn't need to filter the first N rows when it displays the menu. It can just call the SQL:

select*from abrh_recrod where and userId=2 and display all the result set.

The alternative approach is not to perform any cleaning process, but limit the result set when candidates for display are fetched from the database. In this case the fetching SQL may look like:

```
Select*from
(
  select id from abrh_record where userId=2 order by timestamp desc)
) where rownum<20
``` where the inner most statement returns the time-ordered list of menu entries for a given user and the outer-statement cuts away all the records except for the first 20.

Here, it is assumed that the table depicted IN FIG. 5 is called "abrh_record"

Registering a Visited Page

In an embodiment, particular pages in the application may be worth remembering in ABRH, so that the user can return to these pages later. In order to achieve remembering the particular pages, the following occurs, according to the embodiment:

When the user visits a page which is worth recording in ABRH, the page contains the code which enters a record into ABRH data structure, e.g. a database table. In an embodiment, a programmer who writes the page writes this code during normal development cycle.

Optionally such code may create a few more related ABRH records or, used interchangeably herein, entries, e.g. such entries which may be convenient to display in the ABRH menu once the user has visited a given page. For example, when an application renders (executes) a "Notice Recipient" page, the application may also create ABRH entries for Matter and Request pages.

If decided by design, the code responsible for managing records in the persistent store also makes sure there are no duplicate ABRH entries. If such entries are found, the code may update their timestamps or affect the sequence of display in another way to make sure these entries are displayed as most recent instead of creating an additional entry.

For example, suppose a user navigated to the matter view page to view the matter "People vs. Smith". Then he navigated away from the matter view page and after a while navigated back to matter view page for "People vs. Smith". The first time the user entered the view page for "People vs. Smith" an entry in ABRH was created. The next time the user entered the same page with the same context ("People vs. Smith"), the existing ABRH entry's timestamp was updated as opposed to creating another entry.

It should be appreciated that if the user first views the matter "People vs Smith" and then, at a second time, the user views the matter "Johnson vs. Pupkin", these two visits to two separate and distinct matter pages result in two different ABRH entries because the context is different.

Displaying Recent Navigation History

In an embodiment, the history is displayed as a simple HTML drop down or a DHTML picker. In an embodiment, a DHTML picker is a kind of menu generated as a block of HTML code, which typically provides a better quality user interface than a typical drop down control. DHTML stands for "Dynamic HTML" meaning that the elements on the page can be dynamically turned on/off or repositioned and is a known term in web development community. Displaying history as a DHTML picker allows for more flexibility such as:

being able to browse through more history entries;

showing contextual entries (e.g., Matter 604, Request 606) in a hierarchical form; and Showing a plurality of hyperlinks next to each entry. For example in FIG. 5 a "humans" icon is displayed to the right of a link pointing to the virtual interview page.

In an embodiment, the menu gets assembled by looking up the ABRH entries in the database and building a user interface menu element based of the contents of these entries. The code which assembles the menu resolves ABRH information into URLs. For example, the first record in FIG. 5 may be converted into a URL using the following logic:

```
If type="NoticeEdit" then
    url="/notice_edit.jsp?notice_id="+value1;
else if type="RecipDetail"
    url="/notice_recipient_det.jsp?notice_id="+value1+
        "&person_id="+value2;
else
//assebble the URL of some other type
. . . .
```

Note that each entry in the menu may contain a plurality of hyperlinks. For example, one hyperlink pointing to a view page and another hyperlink pointing to the edit page of the same object.

Alternatively, URLs inside the menu may point to some intermediate resource and pass information sufficient for this resource to redirect the browser to the final destination. In this scenario, display logic doesn't need to resolve ABRH entries into final URLs.

For example the logic may be modified as follows:

```
If type="NoticeEdit" then
    url="/notice_redirect.jsp?notice_id="+value1;
else
//assebble the URL of some other type
. . . .
```

When the notice_redirect.jsp page populates the user session with the current notice id and redirect to the notice edit page, following is sample code for notice_redirect.jsp page:

```
. . .
String noticeId=request.getParameter("notice_id");
session.setAttribute("notice_id", notice_id);
response.sendRedirect("notice_edit.jsp");
```

As described earlier, such technique can be used if the application is "stateful", i.e. the destination page requires a user session to be pre-populated with some data.

Redirecting a User to a History Page Once the User Chooses a Menu Item

Depending on design of the menu, in an embodiment, redirection is performed when a user clicks the URL on ABRH menu. Or, redirection is performed when the user submits the form by clicking on the item on the menu.

The following should be appreciated. According to an embodiment, it is possible to build a URL so that such URL shows up in ABRH menu as described in the examples above. As well, it is possible to defer building the URL until after the user clicks on the menu item. In the latter scenario, the URLs in the menu item now point to a common place (a redirect page) and pass the ABRH entry ID. Then the redirect page builds the final URL and redirect the browser to it.

High Level Implementation

Figure 7:
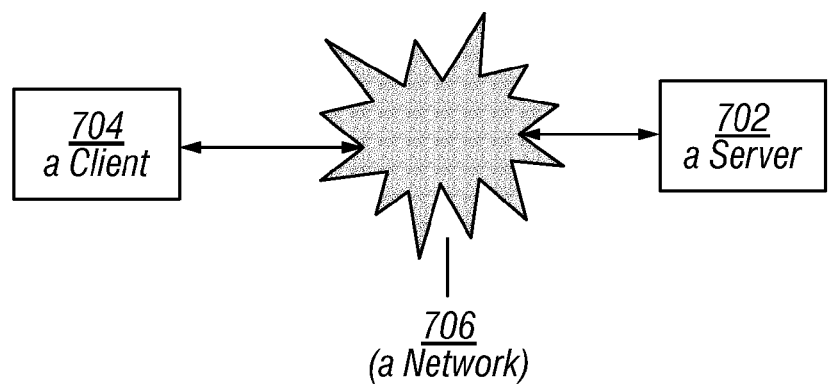
FIG. 7 is a high level implementation, according to an embodiment.

A high level implementation according to an embodiment can be described with reference to FIG. 7. FIG. 7 is a schematic diagram showing two machines, a server 702 and a client 704 in communication over a network 706. Server 702 maintains a database of ABRH entries, renders the web pages, renders the ABRH menu, and presents the results as HTML to the browser. Client machine 704 runs the browser and displays the user-interface (UI) to the user. In an embodiment, client machine 704 may be a personal digital assistant (PDA), a network appliance and a cell phone. In an other embodiment, it is contemplated that the database server and/or the application server may be split or distributed between server 702 and client machine 704 because the database and application are not required to run on the same machine. It should be such implementations are by way of example only.

Computer Implementation

Figure 8:
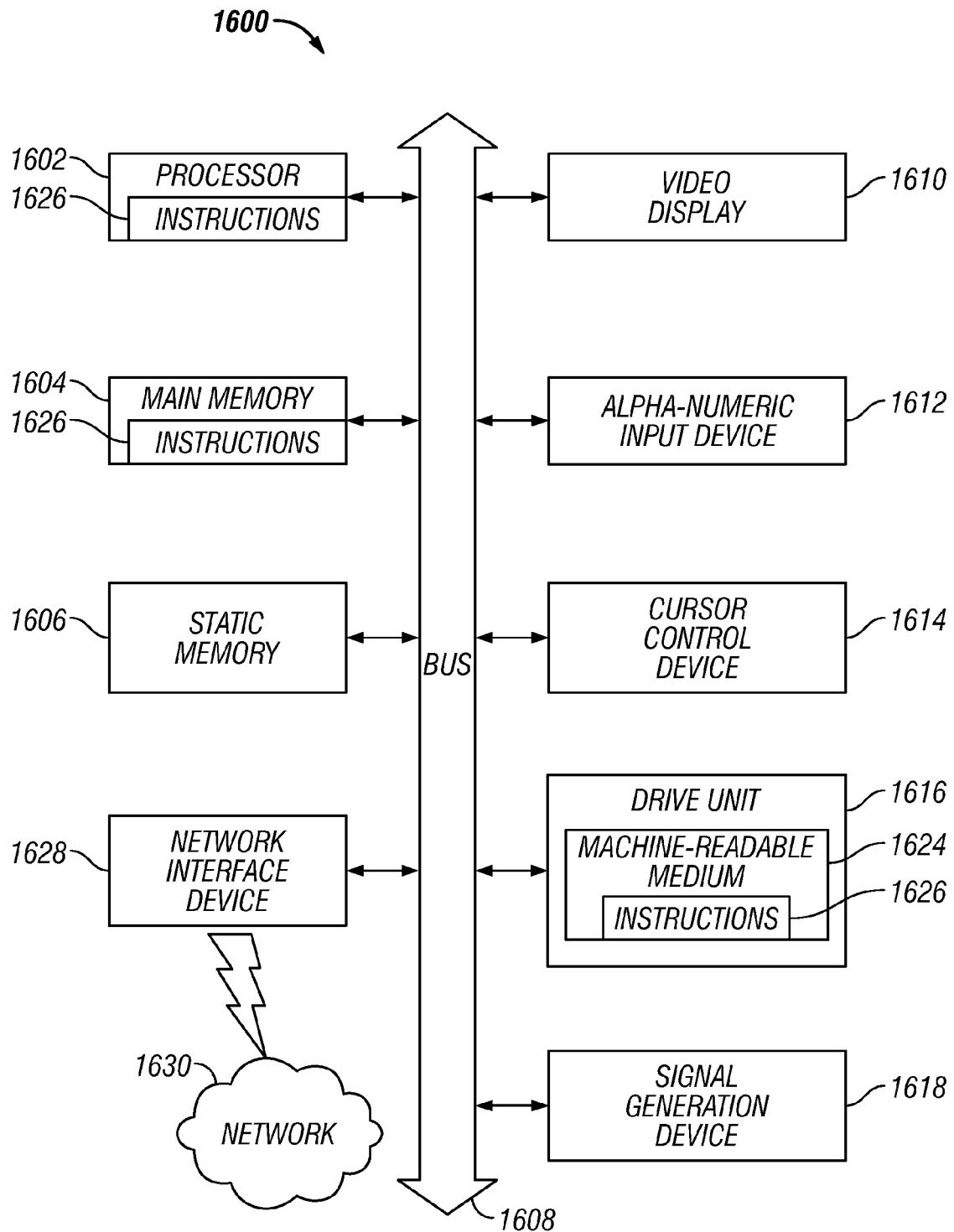
FIG. 8 is a block schematic diagram of a machine in the exemplary form of a computer system within which a set of instructions may be executed to cause the machine to perform any of the herein disclosed methodologies.

FIG. 8 is a block schematic diagram of a machine in the exemplary form of a computer system 1600 within which a set of instructions may be executed to cause the machine to perform any one of the herein disclosed methodologies. In alternative embodiments, the machine may comprise or include a network router, a network switch, a network bridge, PDA, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for managing recent activity navigation in a web application, comprising the steps of:

providing one or more processors;

providing a non-transitory computer readable storage medium coupled to one of said one or more processors;

maintaining an application navigation history;

registering a visited web page in said application navigation history and storing said registered visited web page in said non-transitory computer readable storage medium;

linking the visited web page in the application navigation history to an intermediate resource page, wherein the intermediate resource page includes an intermediate redirect resource that performs one or more activities and, based on the one or more activities, redirects the browser to a final destination web page that is associated with the visited web page;

displaying a menu on a web page, the menu including the application navigation history; and in response to a user selecting a menu item associated with the visited web page from said displayed menu, navigating a browser to the intermediate resource page associated with said registered visited web page, including passing information data to the intermediate resource page for use by the intermediate resource page to redirect the browser to a final destination web page;

updating, by the intermediate redirect resource included in the intermediate resource page, server-side session data including overwriting an already-populated session variable with a previously-saved value prior to redirecting the browser to a stateful final destination web page associated with the visited web page; and redirecting, the browser to the stateful final destination web page that is associated with the visited web page based at least in part on the overwritten session variable.

2. The method of claim 1, wherein said non-transitory computer readable storage medium stores the information data comprising any of:

a title;

a navigation event type;

context parameters that are later resolved into a uniform resource locator (URL) that is associated with said registered visited web page and a context that said page is supposed to display; and a timestamp.

3. The method of claim 1, wherein said maintaining application navigation history further comprises distinguishing navigation entries belonging to different users.

4. The method of claim 1, wherein said maintaining application navigation history further comprises any of the steps of:

maintaining a fixed number of navigation entries; and filtering most recent navigation entries to display said most recent navigation entries in said menu.

5. The method of claim 1, wherein said registering said visited web page further comprises providing code that causes one or more records associated with said visited web page to be created and stored in said storage.

6. The method of claim 5, wherein said code further ensures that there are no duplication of records.

7. The method of claim 1, wherein said displaying said menu further comprises any of:

displaying contextual entries in a hierarchical form; and displaying one or more hyperlinks next to each displayed entry.

8. The method of claim 1, wherein said displaying said menu further comprises assembling said menu by looking up records in said non-transitory computer readable storage medium and resolving particular stored information into associated URLs.

9. The method of claim 1, wherein said displaying said menu further comprises displaying two or more links to web pages, wherein each of the web pages is associated with a same object.

10. An apparatus for managing recent activity navigation in a web application, comprising:

one or more processors;

a non-transitory computer readable storage medium coupled to one of said one or more processors;

a maintaining agent configured to maintain an application navigation history;

a registering agent configured to register a visited web page in said application navigation history and store said registered visited web page in said non-transitory computer readable storage medium;

a display agent configured to display a menu on a web page, the menu including the application navigation history; and a navigating agent configured to link the visited web page in the application navigation history to an intermediate resource page, wherein the intermediate resource page includes an intermediate redirect resource that performs one or more activities and, based on the one or more activities, redirects the browser to a final destination web page that is associated with the visited web page;

wherein the navigation agent is further configured to, in response to a user selecting a menu item associated with the visited web page from the displayed menu, navigate a browser to the intermediate resource page associated with said registered visited web page, including passing information data to the intermediate resource page for use by the intermediate resource page to redirect the browser to a final destination web page;

wherein the navigation agent is further configured to update, by the intermediate redirect resource included in the intermediate resource page, server-side session data including overwriting an already-populated session variable with a previously-saved value prior to redirecting the browser to a stateful final destination web page associated with the visited web page; and wherein the navigation agent is further configured to redirect the browser to the stateful final destination web page that is associated with the visited web page based at least in part on the overwritten session variable.

11. The apparatus of claim 10, wherein said non-transitory computer readable storage medium stores informational the information data comprising any of:

a title;

a navigation event type;

context parameters that are later resolved into a uniform resource locator (URL) that is associated with said registered visited web page and a context that said page is supposed to display; and a timestamp.

12. The apparatus of claim 10, wherein said maintaining agent is further configured to distinguish navigation entries belonging to different users.

13. The apparatus of claim 12, wherein said display agent is further configured to assemble said menu by looking up records in said non-transitory computer readable storage medium and resolving particular stored information into associated URLs.

14. The apparatus of claim 10, wherein said maintaining agent is further configured to:

maintain a fixed number of navigation entries; and filter most recent navigation entries to display said most recent navigation entries in said menu.

15. The apparatus of claim 10, wherein said registering agent is further configured to provide code that causes one or more records associated with said visited web page to be created and stored in said non-transitory computer readable storage medium.

16. The apparatus of claim 15, wherein said code further ensures that there are no duplication of records.

17. The apparatus of claim 10, wherein said display agent is further configured to:

cause the display to display contextual entries in a hierarchical form; and cause the display to display one or more hyperlinks next to each displayed entry.

18. The apparatus of claim 10, wherein said display agent is further configured to cause the display to display two or more links to web pages, wherein each of the web pages is associated with a same object.

19. A computer readable storage medium for storing program instructions that, when executed by a processor, cause the processor to implement a method for managing recent activity navigation in a web application, comprising the steps of:

providing one or more processors;

providing a computer readable storage medium coupled to one of said one or more processors;

maintaining application navigation history;

registering a visited web page in said application navigation history and storing said registered visited web page in said computer readable storage medium;

linking the visited web page in the application navigation history to an intermediate resource page, wherein the intermediate resource page includes an intermediate redirect resource that performs one or more activities and, based on the one or more activities, redirects the browser to a final destination web page that is associated with the visited web page;

displaying a menu on a web page, the menu including at least a portion of the application navigation history;

in response to a user selecting a menu item associated with the visited web page from the displayed menu, navigating a browser to the intermediate resource page associated with said registered visited web page, including passing information data to the intermediate resource page for use by the intermediate resource page;

updating, by the intermediate redirect resource included in the intermediate resource page, server-side session data including overwriting an already-populated session variable with previously-saved value prior to redirecting the browser to a stateful final destination web page associated with the visited web page; and redirecting, the browser to the stateful final destination web page that is associated with the visited web page based at least in part on the overwritten session variable.

\* \* \* \* \*